United States Patent
Singh et al.

(10) Patent No.: US 10,541,918 B2
(45) Date of Patent: Jan. 21, 2020

(54) DETECTING STALE MEMORY ADDRESSES FOR A NETWORK DEVICE FLOW CACHE

(71) Applicant: Juniper Networks, Inc., Sunnyvale, CA (US)

(72) Inventors: Manmeet Singh, Fremont, CA (US); L. Timothy Patrick, Los Gatos, CA (US); Swamy Sadashivaiah Renu Kananda, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 9 days.

(21) Appl. No.: 15/902,905

(22) Filed: Feb. 22, 2018

(65) Prior Publication Data

US 2019/0260676 A1    Aug. 22, 2019

(51) Int. Cl.
```
H04L 12/747    (2013.01)
H04L 12/721    (2013.01)
H04L 12/851    (2013.01)
H04L 12/741    (2013.01)
```
(52) U.S. Cl.
CPC ............ *H04L 45/742* (2013.01); *H04L 45/38* (2013.01); *H04L 47/2483* (2013.01); *H04L 45/745* (2013.01)

(58) Field of Classification Search
CPC .... H04L 45/38; H04L 45/742; G06F 11/1016; G06F 16/24562; G06F 2212/7202; G06F 9/3834; G06F 12/023; G06F 12/0246; G06F 12/0802; G06F 2212/657; G06F 9/5016

See application file for complete search history.

(56) References Cited

U.S. PATENT DOCUMENTS

| | | | |
|---|---|---|---|
| 7,177,311 B1 | 2/2007 | Hussain et al. | |
| 2016/0373364 A1 | 12/2016 | Yokota | |
| 2017/0005907 A1* | 1/2017 | Onno | H04L 12/66 |
| 2017/0063689 A1* | 3/2017 | Qin | H04L 45/38 |
| 2017/0091258 A1* | 3/2017 | Rajahalme | H04L 45/021 |
| 2019/0121750 A1* | 4/2019 | Keeton | |

OTHER PUBLICATIONS

Extended European Search Report, dated Jun. 4, 2019, received in corresponding EP Application No. 18209380.7, 10pp.

* cited by examiner

*Primary Examiner* — Marsha D Banks Harold
*Assistant Examiner* — Elton Williams
(74) *Attorney, Agent, or Firm* — Shumaker & Sieffert, P.A.

(57) ABSTRACT

An example network device includes a flow cache configured to store a flow cache entry that indicates a memory address referenced by one or more actions of the flow cache entry and a first learn index for the memory address, a memory address map configured to store a second learn index for the memory address, and one or more processors implemented in circuitry. The network device is configured to receive a packet for the flow and obtain, from the flow cache entry for the flow, the memory address referenced by the one or more actions and the first learn index. The network device is further configured to determine the first learn index matches the second learn index and forward, in response to the determining, the packet using the one or more actions of the flow cache entry.

16 Claims, 5 Drawing Sheets

DETECTING STALE MEMORY ADDRESSES FOR A NETWORK DEVICE FLOW CACHE

TECHNICAL FIELD

This disclosure relates to computer networks and, more particularly, to forwarding traffic within computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may he lost during transmission. The packets are transmitted between the source device and destination device using intermediate network devices, such as gateways, firewalls, switches and routers.

In order to improve the speed at which the network device forwards packets, a network device may use a flow cache that includes a minimal list of forwarding actions per flow. A forwarding subsystem of the network device continues to maintain full forwarding state. As such, the network device forwards a packet for a particular flow using the flow cache for actions that do not need the full forwarding state and forwards the packet for the particular flow using the forwarding subsystem for actions that need the full forwarding state. In this way, the network device may provide an efficient mechanism for forwarding packets for a flow without relying solely on a full forwarding state stored by a forwarding subsystem of the network device.

SUMMARY

In general, techniques are described for detecting stale memory addresses referenced by a network device flow cache. A memory location referenced by a packet processing action of a flow cache entry for a network device flow cache may be asynchronously freed or reallocated and thus rendered stale by the network device forwarding subsystem. In an example, in response to detecting a reallocation or freeing of a memory address, the network device may invalidate or refresh an impacted flow cache entry to prevent forwarding packets with stale forwarding state in the form of one or more packet processing actions that reference the stale memory address.

In some examples, the network device may register reallocation or freeing of a memory address to a memory address map having one or more entries that each maps a different memory address to a learn index that represents a number of times the memory address has been reallocated or freed by the network device. Accordingly, a flow cache entry may be configured with a packet processing action that references a memory address and also includes a local learn index for the memory address. If the local learn index in the flow cache entry does not match the learn index for the memory address in the memory address map, this indicates the memory address is stale and the flow cache entry is invalid. In response to determining that a particular memory address is stale, the network device may forward packets using the forwarding state stored by a forwarding subsystem of the network device to ensure that a valid memory address is used to perform actions for forwarding the packet. The forwarding subsystem may refresh or create a new flow cache entry with actions having an updated memory address reference to synchronize the memory address represented in the flow cache with the master memory references of the forwarding state of the forwarding subsystem.

In an example, a method includes receiving, by a network device, a packet for a flow. The method further includes obtaining, by the network device from a flow cache entry for the flow, a memory address referenced by one or more actions of the flow cache entry and a first learn index for the memory address. The first learn index indicates a first allocation of the memory address. The method further includes determining, by the network device, the first learn index matches a second learn index stored to a memory address map entry for the memory address in a memory address map. The second learn index indicates a second allocation of the memory address. The method further includes forwarding, by the network device in response to the determining, the packet using the one or more actions of the flow cache entry.

In another example, a network device includes a flow cache, a memory address map, and one or more processors implemented in circuitry. The flow cache is configured to store a flow cache entry for a flow. The flow cache entry indicates a memory address referenced by one or more actions of the flow cache entry and a first learn index for the memory address. The first learn index indicates a first allocation of the memory address. The memory address map is configured to store a second learn index for the memory address, the second learn index indicating a second allocation of the memory address. The one or more processors being are configured to receive a packet for the flow and obtain, from the flow cache entry for the flow, the memory address referenced by the one or more actions of the flow cache entry and the first learn index for the memory address. The one or more processors are further configured to determine the first learn index matches the second learn index and forward, in response to the determining, the packet using the one or more actions of the flow cache entry.

In another example, a computer-readable storage medium is encoded with instructions for causing one or more programmable processors of a computing device to receive a packet for a flow and obtain, from a flow cache entry for the flow, a memory address referenced by one or more actions of the flow cache entry and a first learn index for the memory address. The first learn index indicates a first allocation of the memory address. The instructions further cause the one or more programmable processors to determine, the first learn index matches a second learn index stored to a memory address map entry for the memory address in a memory address map, the second learn index indicating a second allocation of the memory address and forward, in response to the determining, the packet using the one or more actions of the flow cache entry.

In another example, a device includes means for receiving a packet for a flow and means for obtaining, from a flow cache entry for the flow, a memory address referenced by one or more actions of the flow cache entry and a first learn index for the memory address. The first learn index indicates a first allocation of the memory address. The device further includes means for determining the first learn index matches a second learn index stored to a memory address map entry for the memory address in a memory address map, the second learn index indicating a second allocation of the memory address and means for forwarding, in response to the determining, the packet using the one or more actions of the flow cache entry.

The techniques of this disclosure may provide one or more technical advantages. For example, the techniques may enable a network device to rapidly identify invalid memory addresses referenced by actions stored to a flow cache and to facilitate validation of flow cache entries. Limiting the instances of forwarding using invalid (e.g., stale) addresses may help to reduce network device failures (e.g., a crash). Configuring a flow cache to include learn indexes for memory addresses references by actions stored to flow cache entries may increase the scale and performance of a network device as compared to conventional methods of relying on large time delays to account for the flow cache refresh cycle of obtaining updated actions from the forwarding system. The increase in scale that may result from implementing the techniques of this disclosure may correlate to the number of entries in the flow cache.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
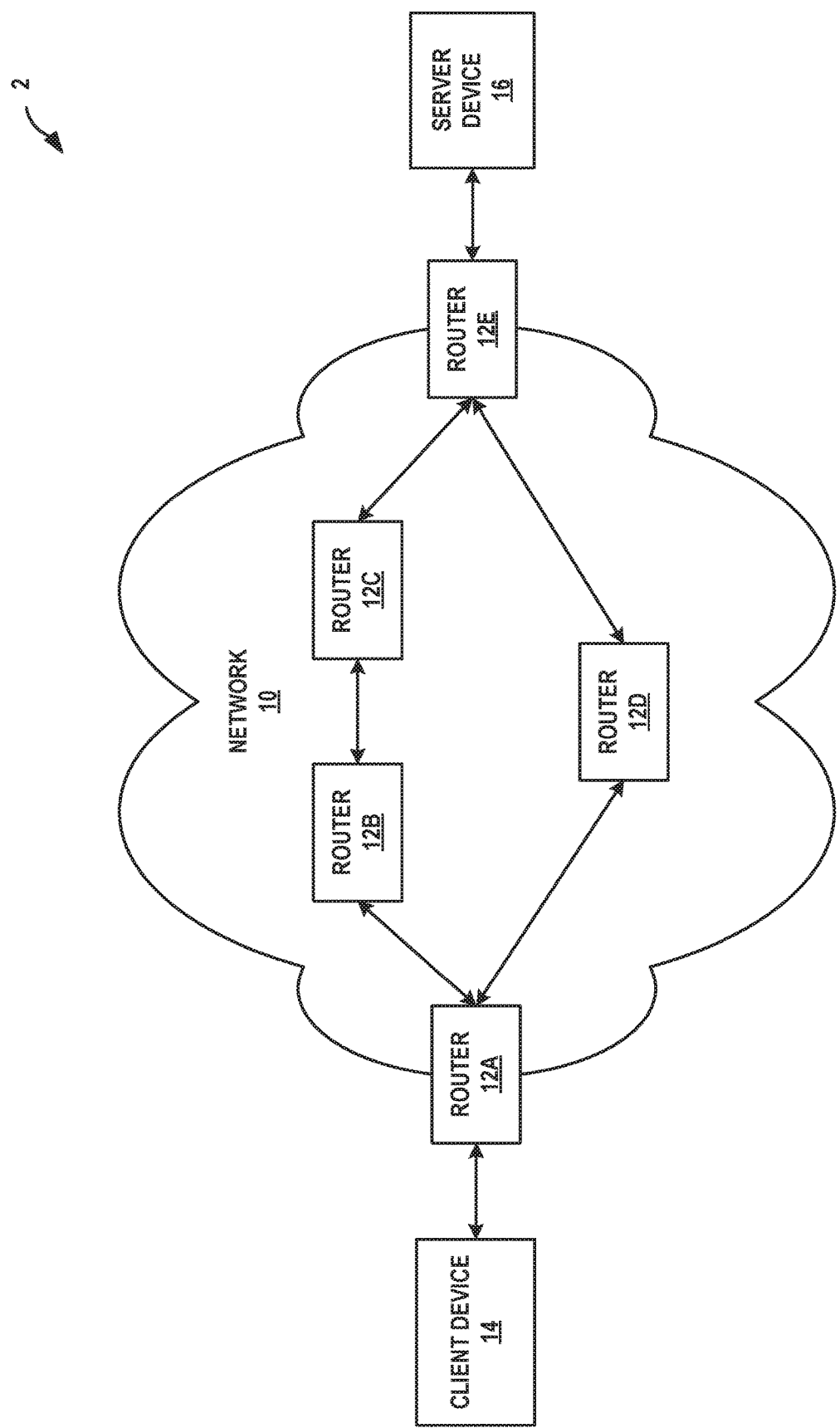
FIG. 1 is a block diagram illustrating an example system including a variety of network devices, any of which may implement the techniques of this disclosure.

In a flow cached environment, if memory addresses are cached there is a likelihood of incorrect processing when the memory addresses are asynchronously freed by a forwarding subsystem. The problem of incorrect processing may be exacerbated as the number of flows increases, which may result in a higher refresh time for the flow cache. The problem of incorrect processing may limit the ability for network devices to scale up the number of flows.

More specifically, for example, some flow cache mechanisms may rely on storing a minimal list of forwarding actions per flow without the burden of maintaining and processing each packet using the full forwarding state. However, the forwarding subsystem may continue to maintain a full forwarding state for each flow.

A forwarding component may periodically refresh the flow cache by, for example, sending a cached packet per flow to the forwarding subsystem. Many forwarding actions are independent of a current forwarding state. Examples of forwarding actions that are independent of a current forwarding state may include, but are not limited to, for example, packet manipulation actions (e.g., decapsulation, encapsulation, etc.) or another forwarding action that is independent of a current forwarding state. However, certain actions, such as, but not limited to, policers, counter updates, media access control (MAC) table aging may update forwarding memory at memory addresses referenced by the actions. The actions may only cache a memory address during initial learning and/or refresh of a corresponding flow cache entry.

In some network devices, as the number of cached flows increases, the time taken for the flow cache to refresh increases. Unfortunately, in such network devices, there may be no way for the network device processing a packet using the flow cache to know if a cached memory address is valid. Instead, the network device may rely on a refresh cycle to complete to ensure an updated memory address. This refresh cycle may result in a non-trivial exposure time window where a flow cache continues to process packets using stale memory addresses. If the memory address happens to be freed and re-allocated by a control plane process in this window, processing packet using an action that references this memory address may lead to a crash. A new allocation of memory at a memory address may be referred to herein as an allocation of the memory address.

To address one or more of the above, techniques are described for identifying reallocated or freed memory addresses referenced by actions of a network device flow cache. In this example, a network device may maintain, in a memory address map, learn indexes for memory addresses of network device memory. Depending on the desired scale, the network device may use a more or fewer number of bits for the learn index on a per-memory address basis. For a given memory address represented in the memory address map, the network device increments the learn index upon each allocation of that memory address.

During the flow cache refresh cycle, as the flow cache learns flow actions for processing packet flows, the network device additionally stores, to the flow cache entries, learn indexes in addition to memory addresses referenced by the packet processing actions. In the packet processing path, the forwarding component may validate a memory address before executing any packet processing actions that reference the memory address. The validation may be based on comparing the cached (or "local") learn index in the flow cache with the learn index for the memory address in the memory address map. If a mismatch is detected, the network device invalidates the flow cache entry and reinjects the packet to the forwarding subsystem (e.g., for slow path processing). In this way, the packet may be processed immediately using the forwarding subsystem and new actions and memory addresses refreshed to the flow cache.

The memory address and learn index techniques described herein may enable the network device to detect changes in memory address allocation when processing packets using the flow cache. The network device may invalidate the impacted flow cache entry, which helps to reduce, and in some cases eliminate, the exposure of the network device to forwarding packets with stale forwarding state.

Removing the exposure of flow cache to forward packets with stale forwarding state may help to remove a scaling bottleneck for network devices. Removing the exposure of flow cache to forward packets with stale forwarding state may also help to provide the ability to scale a number of flows with memory. If a higher scale is desired, this may translate to a higher refresh rate for flow cache. As more bits are added to the learn index, the network device may provide for a larger "safe window." Use of a learn index may be generalized and leveraged in other environments relying on caching (e.g., flow caching) as well. If forwarding state can change asynchronously, this mechanism may be used to validate in real time without waiting for a full refresh cycle from the forwarding subsystem to the flow cache.

FIG. 1 is a block diagram illustrating an example system 2 that includes a variety of network devices, any of which may implement the techniques of this disclosure. As illustrated in FIG. 1, system 2 includes network 10, client device 14, and server device 16. Network 10 includes routers 12A-12E (collectively, "routers 12") that facilitate the access of content between various network devices connected to network 10, including client device 14 and server device 16. While illustrated as including routers 12, in other examples, system 2 may include additional or alternative network devices, such as gateways, switches, hubs, firewall, intrusion detection/prevention (IDP) devices, and/or any other type of networking equipment or device that facilitates the transfer of data between the various network devices. Although described with respect to a router or other network device, any device that includes a flow cache may implement the techniques described herein and the techniques should not be limited to routers or other network devices.

Network 10 enables transmission of content between network devices using one or more packet-based protocols, such as a Transmission Control Protocol Internet Protocol (TCP/IP). In this respect network 10 may support the transmission of data via discrete data units, often referred to as "packets." As a result, network 10 may be referred to as a "packet-based" or "packet switched" network. While described in this disclosure as transmitting, conveying, or otherwise supporting packets, network 10 may transmit data according to any other discrete data unit defined by any other protocol, such as a cell defined by the Asynchronous Transfer Mode (ATM) protocol, or a datagram defined by the User Datagram Protocol (UDP).

Client device 14, in this example, represents a device that submits requests for services to server device 16. Server device 16, likewise, represents an example of a device that provides services to client device 14 in response to requests. Client device 14 and server device 16 may also participate in a bidirectional communication session, in which server device 16 requests services from client device 14, and client device 14 provides the requested services to server device 16. In this manner, client device 14 and server device 16 can each act as both a server and a client, Client device 14 may represent an endpoint device, such as a mobile device (e.g., a laptop computer, tablet computer, or cellular phone), a personal computer, a computing terminal, an Internet-capable television or device for providing Internet-based television services, or other such devices. Server device 16 may represent a web server, a file server, a peer device (e.g., another user's computing device), a database server, a print server, or other device from which a client device requests services.

Client device 14 submits requests to server device 16 via network 10. In the example illustrated in FIG. 1, client device 14 is communicatively coupled to router 12A. In other examples, client device 14 may be communicatively coupled to router 12A via additional network devices, such as access lines, wireless infrastructure and backhaul networks, and the like. Routers 12 of network 10 are configured to determine routes through network 10 to reach various destinations, such as server device 16. Routers 12 implement routing protocols to determine routes through network 10, as well as to share determined routes with other routers 12. In the example of FIG. 1, router 12A determines that two routes exist to reach server device 16. A first route beginning at router 12A to reach server device 16 includes router 12D, router 12E, and server device 16. A second route beginning at router 12A to reach server device 16 includes router 12B, router 12C, router 12E, and server device 16. In general, router 12A includes a control plane that executes routing protocols to learn the topology of network 10 and to select one of these routes over the other. Upon receiving data from client device 14 destined for server device 16, a data plane of router 12A performs a lookup function on keying information within the packet and forwards the data along the selected route.

As part of forwarding a packet, routers 12 may determine, using a flow cache, a set of actions to be performed on packets that match the conditions defining a packet flow. In various examples, the conditions specify one or more of a source Internet protocol (IP) address, a destination IP address, a source port, a destination port, a protocol, and/or other fields of a packet. The actions to perform may include one or more of counting the packet, policing the packet, updating a MAC address table, appending a label to the packet (for multiprotocol label switching (MPLS) to tunnel the packet), removing or swapping a label on the packet, inspecting the packet for viruses, performing deep packet inspection on the packet, performing quality of service processing on the packet (e.g., prioritizing the packet over other packets), blocking or dropping the packet (e.g., when the source or destination associated with the packet have been determined to be malicious) or other services.

In some examples, routers 12 may each implement a flow cache that includes a minimal list of forwarding actions per flow, without the burden of maintain a full forwarding state of each flow. For example, router 12A may generate allow cache entry for a flow that includes an action that references a memory address. For example, a counter action for a flow may reference the memory address for the counter value and, when resolved, allows router 12A to increase the counter value by performing the counter action. In this example, rather than applying the full forwarding state of the router 12A, router 12A may forward a packet for the flow and complete the action using only the flow cache entry having the cached one or more actions for the flow (and thus for the packet).

In accordance with the techniques of this disclosure, router 12A may receive a packet for a flow. In this example, router 12A may obtain, from a flow cache entry for the flow, a memory address referenced by one or more actions of the flow cache entry and a first learn index for the memory address. For instance, router 12A may obtain, from a flow cache entry for the flow, a memory address "0x1000" that is referenced by a counter action of the flow cache entry and a first learn index "00" (in this case, a bitstring with two bits and value 0) for the memory address "0x1000." In some examples, the first learn index may indicate a first allocation of the memory address. For instance, the first learn index "00" may indicate a first allocation of the memory address "0x1000" as stored in a flow cache of router 12A.

In this example, router 12A may determine the first learn index matches a second learn index stored to a memory address map entry for the memory address in a memory address map. For instance, router 12A may determine the first learn index of "00" matches a second learn index of "00" stored to a memory address map entry for the memory address 0x1000" in a memory address map of router 12A. In some examples, the second learn index may indicate a second allocation of the memory address. For instance, the second learn index "00" may indicate a second allocation of the memory address "0x1000" as stored in a memory address map of router 12A.

In response to determining the first learn index matches the second learn index, router 12A may forward the packet using the one or more actions of the flow cache entry. For instance, router 12A may forward, without using a forwarding subsystem, the packet and increment a counter value stored at the memory address "0x1000."

In response, however, to determining the first learn index does not match the second learn index, router 12A may forward the packet using a forwarding subsystem of router 12A. For instance, in response to determining the first learn index ("00") does not match a second learn index ("01"), router 12A may determine that the memory address referenced by one or more actions of the flow cache entry is stale. For example, the router 12A may have re-allocated the memory address such that it is no longer valid for the action in the flow cache entry that referenced the memory address. In this instance, a forwarding subsystem of router 12A may forward the packet and increment a counter value stored at the memory address "0X2000."

Figure 2:
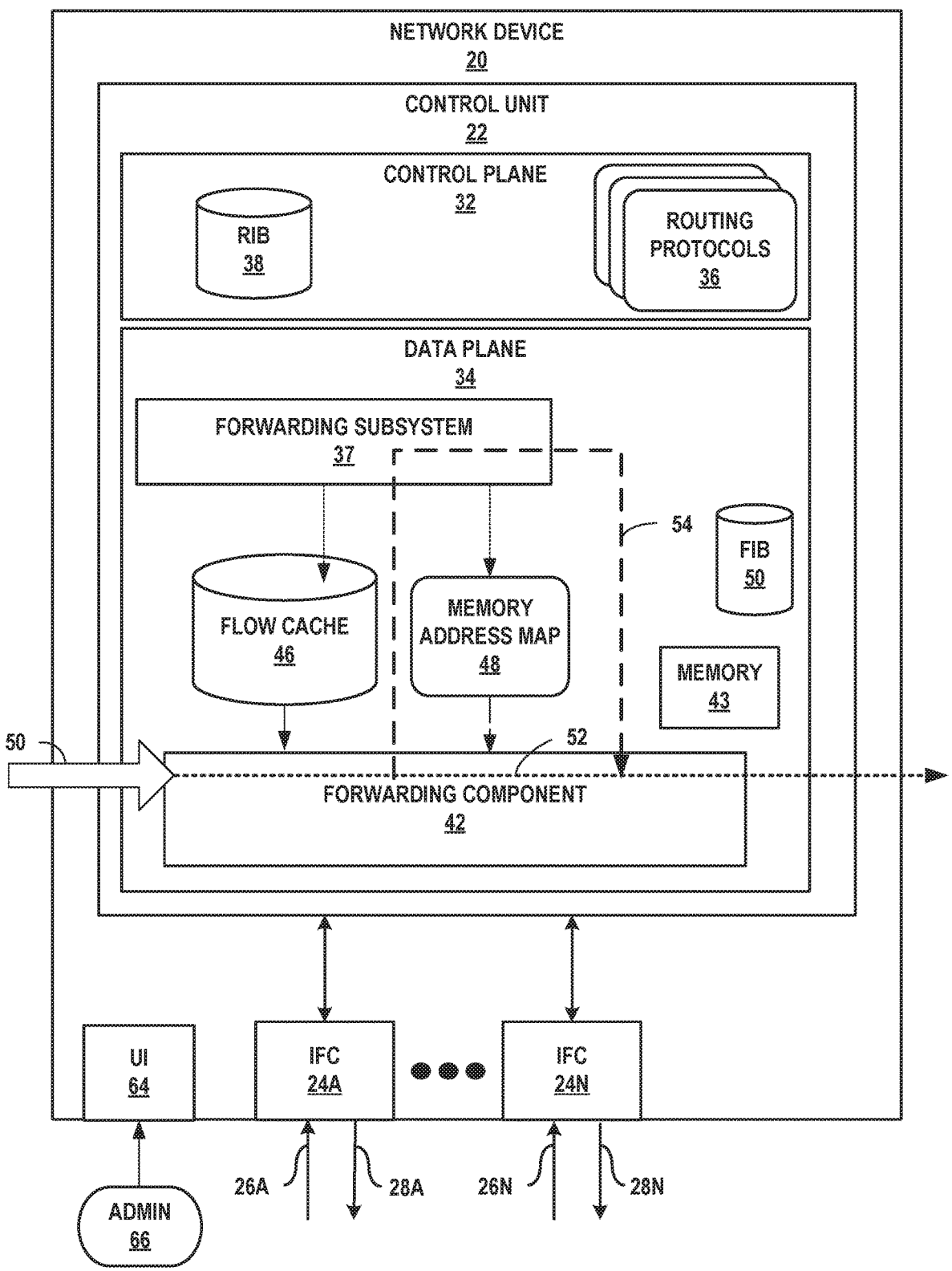
FIG. 2 is a block diagram illustrating an example network device including a flow cache that is configured in accordance with one or more techniques of this disclosure.

FIG. 2 is a block diagram illustrating an example network device 20 including a flow cache 46 that is configured in accordance with one or more techniques of this disclosure. For purposes of illustration, network device 20 may be described below within the context of system 2 shown in the example of FIG. 1 and may represent any one of routers 1. In this example, network device 20 may include control unit 22, interface cards (IFCs) 24A-24N (collectively, "IFCs 24"), and user interface (UI) 64.

Network device 20 frequently includes a chassis (not shown in the example of FIG. 2 for ease of illustration purposes) having a number of slots for receiving a set of cards, including, for example, IFCs 24. Each card may be inserted into a corresponding slot of a chassis for communicably coupling the card to a control unit 22 via a bus, backplane, or other electrical communication mechanism. IFCs 24 send and receive packet flows or network traffic via inbound network links 26A-26N (collectively, "inbound links 26") and outbound network links 28A-28N (collectively, "outbound links 28"). Inbound links 26 and outbound links 28 in some examples for common IFCs form common, physical communication media for the IFCs, which operate in full duplex mode. That is, in some examples, each of IFCs 24 is coupled to respective communication media that can send and receive data substantially simultaneously. In other examples, inbound links 26 and outbound links 28 form separate physical media for respective IFCs 24.

Control unit 22 may include one or more processors (not shown in FIG. 2) that execute software instructions, such as those used to define a software or computer program, stored on a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 22 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 22 may also be divided into logical or physical "planes" to include a first control or routing plane 32, and a second data or forwarding plane 34. In some examples, control unit 22 may be further divided into a third logical or physical "plane," a service plane. That is, control unit 22 may implement three separate functionalities, e.g., the routing, forwarding and service functionalities, either logically, e.g., as separate software instances executing on the same set of hardware components, physically, e.g., as separate physical dedicated hardware components that either statically implement the functionality in hardware or dynamically execute software or a computer program to implement the functionality, or some combination of logical and physical implementations.

Control plane 32 of control unit 22 may provide the routing functionality of network device 20. In this respect, control plane 32 may represent hardware or a combination of hardware and software of control unit 22 that implements routing protocols 36. Routing protocols 36 may include, for example, intermediate system to intermediate system (IS-IS), open shortest path first (OSPF), routing information protocol (RIP), border gateway protocol (BGP), or other routing protocols. By executing routing protocols 36, control plane 32 identifies existing routes through the network and determines new routes through the network. Control plane 32 stores routing information within routing information base (RIB) 38. The routing information may include information defining a topology of a network, such as network 10 of FIG. 1. Control plane 32 may resolve the topology defined by the routing information to select or determine one or more routes through network 10.

Control plane 32 may then update data plane 34 in accordance with these routes to program data plane 34 with forwarding information stored within forwarding information base (FIB) 50. The forwarding information associates keying information (e.g., IP addresses or IP prefixes or labels) with next hops (e.g., neighboring routers) and ultimately with output interfaces of network device 20 coupled to outbound links 28. When forwarding a packet, data plane 34 processes a key extracted from the packet's header to traverse the forwarding information stored in FIB 50 and selects a next hop to which to forward the packet. Based on the selected next hop, data plane 34 identifies the set of one or more outbound links 28 that are coupled to the next hop.

Prior to forwarding a packet via one or more outbound links 28, data plane 34 may apply one or more actions associated with the packet to be forwarded. As illustrated in FIG. 2, data plane 34 may include forwarding subsystem 37. Forwarding subsystem 37 is configured to maintain full forwarding state for each flow.

Data plane 34 may further include a forwarding component 42, flow cache 46, memory 43, memory address map 48, and FIB 50. Memory 43 is a physical memory addressable using physical memory addresses. However, data plane 34 and control plane 32 may virtualize memory 43 to multiple different processes, including forwarding subsystem 37, such that physical memory addresses of memory 43 are addressable using virtual memory addresses mapped to corresponding physical memory addresses.

Forwarding component 42 may be configured to forward packets for a flow using flow cache 46. Flow cache 46 may be configured to store, for each flow, a flow cache entry. Each flow cache entry may include a learn index and a memory address referenced by one or more actions of the flow cache entry. Each flow cache entry may include additional information. Memory address map 48 maps memory address to respective learn indexes. For example, each map entry of memory address map 48 may be keyed to a memory address and enable looking up of the learn index in the map entry for the memory address. Memory address map 48 may store a different map entry for each memory address referenced by any action stored to flow cache 46. Forwarding component 42 may represent a packet processor, ASIC, packet forwarding engine, a general-purpose processor of network device 20, a processor core, or other execution unit that executes packet processing actions represented by FIB 50 of network device and cached packet processing actions of flow cache 46.

In some examples, a system administrator 66 (also referred to as "ADMIN 66") may provide configuration information to network device 20 via a management interface, such as, but not limited to, for example, UI 64 (e.g., a command line interface) included within network device 20. For example, the system administrator may configure network device 20 or install software to otherwise configure flow cache 46 to store a learn index as described herein. In some examples, system administrator 66 may interact with UI 64 to provide configuration information defining a delay threshold. For instance, UI 64 may receive configuration information defining the delay threshold from admin 66. In some examples, system administrator 66 may interact with UI 64 to provide configuration information defining a number of bits for the learn index. For instance, III 64 may receive configuration information defining the number of bits for the learn index from admin 66.

In accordance with one or more techniques described herein, network device 20 may receive a packet 52 for a flow 50. In this example, forwarding component 42 may be configured to obtain, from a flow cache entry of flow cache 46 for packet 52, a memory address referenced by one or more actions of the flow cache entry and a first learn index for the memory address.

In this example, forwarding component 42 may fetch a second learn index stored to a memory address map entry for the memory address from memory address map 48. In response to determining the first learn index of flow cache 46 matches the second learn index fetched from memory address map 48, forwarding component 42 may forward the packet using fast-path processing, i.e., using one or more actions of the flow cache entry obtained from flow cache 46. For instance, forwarding component 42 may perform a policer action to determine whether to drop the packet based on policing information stored at a memory address of flow cache 46. In response to determining to not drop the packet, forwarding component 42 may forward the packet 52 without using the forwarding subsystem.

Network device 20 may receive another packet 54 for the flow 50. In response to determining that the first learn index of flow cache 46 does not match the second learn index fetched from memory address map 48, forwarding component 42 may output the packet 54 to forwarding subsystem 37 for slow-path processing. In this example, forwarding subsystem 37 may forward the packet using a full state of the flow, For instance, forwarding subsystem 37 may perform a policer action to determine whether to drop the packet based on policing information derived from the full forwarding state of network device 20, In this instance, in response to determining not to drop the packet, forwarding subsystem 37 outputs the packet 54 to forwarding component 42 for forwarding.

Figure 3:
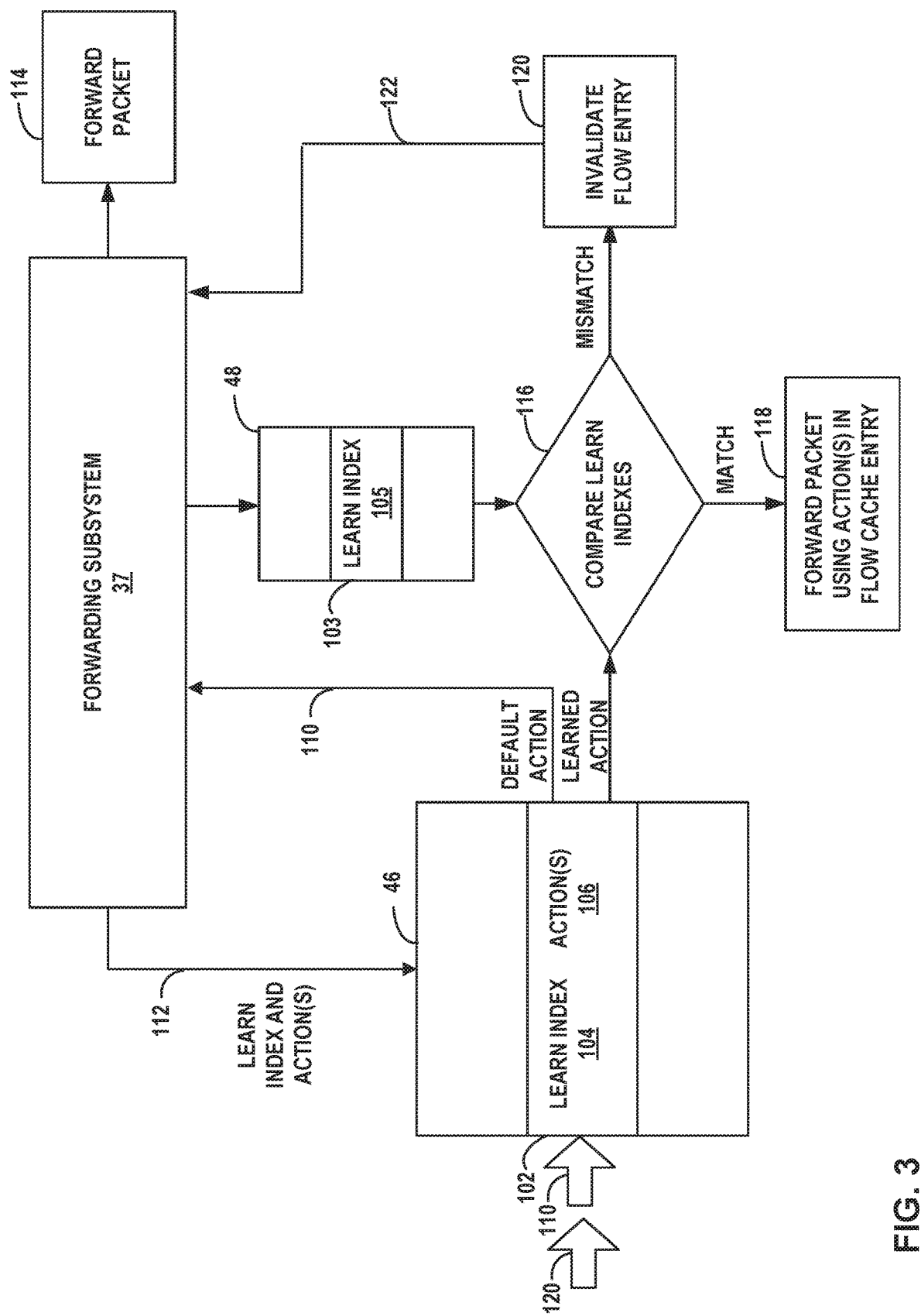
FIG. 3 is a conceptual diagram illustrating an example process for forwarding a packet using learn indexes in accordance with one or more techniques of this disclosure.

FIG. 3 is a conceptual diagram illustrating an example process for forwarding a packet using learn indexes in accordance with one or more techniques of this disclosure. For purposes of illustration only, FIG. 1 and FIG. 2 may be described below within the context of the example of FIG. 3.

Forwarding component 42 receives an initial packet for a flow 110. In response to receiving the initial packet for the flow, forwarding component 42 may attempt to match the packet to a flow cache entry of flow cache 46 and identify a cache miss. Forwarding component 42 may send the packet to forwarding subsystem 37, which determines one or more actions for the flow and processes the initial packet using the actions. Forwarding component 42 may additionally generate a default action for a flow cache entry 102 of flow cache 46 that corresponds to the flow and causes forwarding component 42 to direct packets of the flow to the forwarding subsystem 37. Forwarding subsystem 37 may subsequently generate flow cache entry 102 of flow cache 46 that corresponds to the flow. Although FIG. 3 illustrates three flow cache entries, flow cache 46 may include many more flow cache entries. As shown, flow cache entry 102 includes learn index 104 and one or more actions 106, or simply "action 106." As noted above, action 106 may include a default action generated in response to receiving the initial packet. In instances, where action 106 is a default action, forwarding component 42 may direct matching packets to forwarding subsystem 37. After forwarding subsystem 37 has updated flow cache entry 102 with a list of one or more learned actions for packet processing, forwarding subsystem 37 may process subsequent packets of flow 110 using the learned actions stored to flow cache entry 102 (114).

After generating flow cache entry 102, forwarding component 42 may initiate periodic learning by, for example, sending a cached packet to forwarding subsystem 37. For example, forwarding subsystem 37 may update, for each flow cache entry of cache 46, one or more actions 106 (112). However, as discussed further with respect to FIG. 4, as a number of cache flows increases, the time taken for a flow action learn cycle increases. As such, in some instances, a flow action learn cycle to update action 106 may be completed after forwarding subsystem 37 has reallocated the memory address referenced by action 106 as described in the following examples. Accordingly, forwarding subsystem 37 may increment, in response to reallocating the memory address referenced by the one or more actions, learn index 105. As shown, learn index 105 is stored in a memory address map entry 103 for the memory address in memory address map 48. Memory address map entry 103 maps the memory address referenced by an action 106 in flow cache entry 102 to the learn index 105 updated by forwarding subsystem 37. Forwarding component 42 may use the memory address map entry 103 to determine whether action 106 references a freed or re-allocated memory address and is thus invalid to help to prevent processing packets using stale memory addresses.

In this example, forwarding component 42 receives a packet for the flow (120). In this example, action 106 represents an action list of one or more actions stored to flow cache entry 102. Forwarding component 42 may determine whether learn index 104 for a memory address referenced by one of the actions 106 matches learn index 105 in the memory address map entry 103 for the memory address (116). In response to determining learn index 104 matches learn index 105 ("MATCH" branch of 116), forwarding component 42 may forward the packet using action 106 in flow cache entry 102 (118). In response, however, to determining learn index 104 does not match learn index 105 ("MISMATCH" branch of 116), forwarding component 42 may invalidate flow cache entry 102 (120) and output the packet to forwarding subsystem 37 for forwarding (122).

Figure 4:
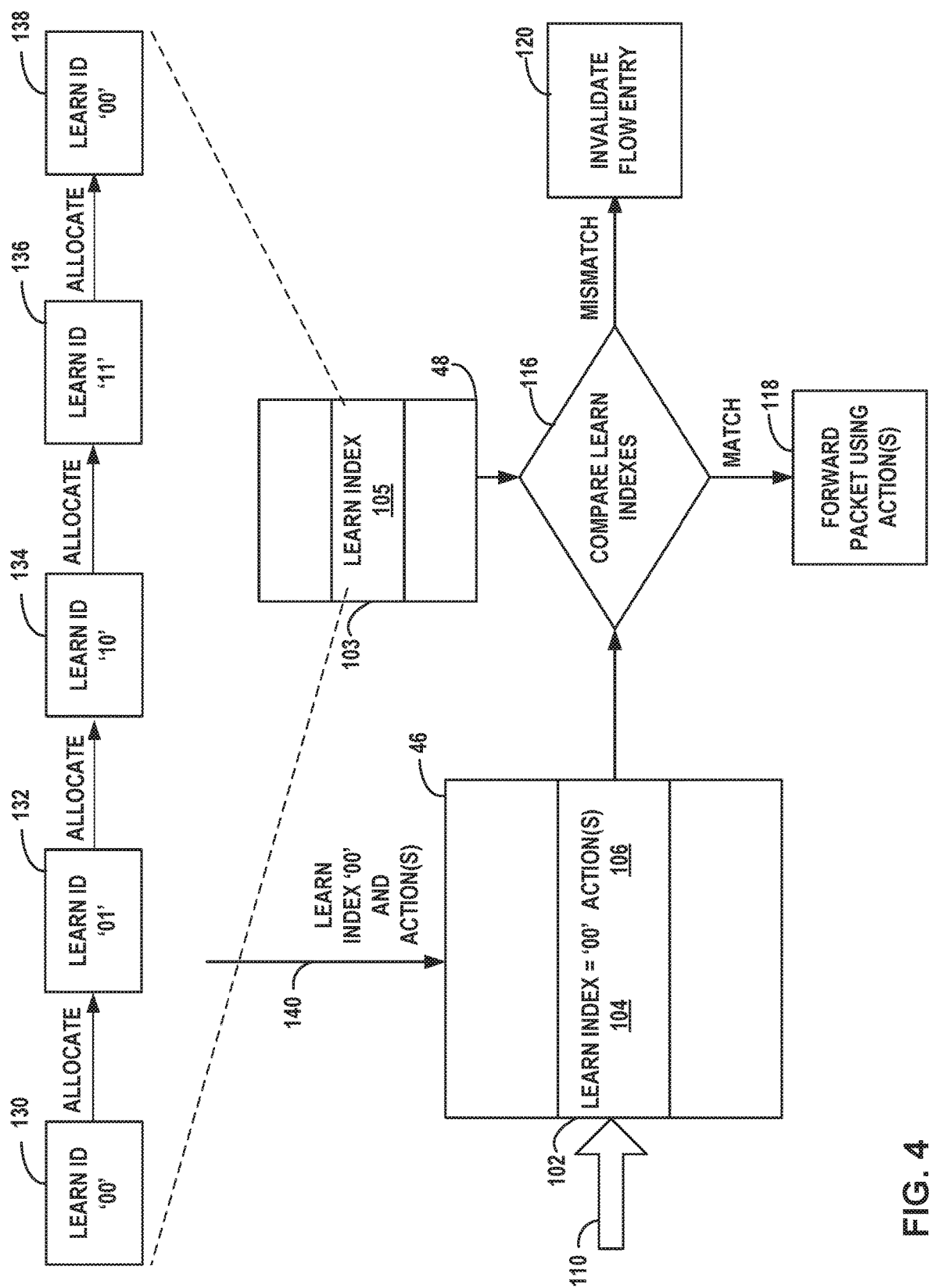
FIG. 4 is a conceptual diagram illustrating an example process for incrementing learn indexes in accordance with one or more techniques of this disclosure.

FIG. 4 is a conceptual diagram illustrating an example process for incrementing learn indexes in accordance with one or more techniques of this disclosure. For purposes of illustration only, FIG. 1, FIG. 2, and FIG. 3 may be described below within the context of the example of FIG. 4.

In the example of FIG. 4, forwarding subsystem 37 allocates the memory address referenced by action 106 and sets learn index 105 to "00" (130). Although the example of FIG. 4 illustrates learn index 104 and learn index 105 as having two bits, learn index 104 and learn index 105 may have one bit or more than three bits. Forwarding subsystem 37 performs a flow action learn cycle (140) that stores, at flow cache entry 102, a memory address referenced by action 106 and sets learn index 104 to match learn index 105. For instance, forwarding subsystem 37 sets learn index to "00," which illustrates a 2-bit bitstring having a value of 0.

However, as shown, after completing the flow action learn cycle and before a subsequent flow action learn cycle, forwarding subsystem 37 reallocates the memory address referenced by action 106. For instance, forwarding subsystem 37 reallocates the memory address referenced by action 106 in response to a configuration change, status change, or another event. In this example, in response to reallocating the memory address referenced by action 106, forwarding subsystem 37 increments learn index 105 (132). For example, forwarding subsystem 37 increments learn index 105 to "01," a bitstring having a value of 1. In this example, forwarding subsystem 37 reallocates the memory address referenced by action 106 and increments learn index 105 to "10" (134). In this example, in response to receiving a packet for a flow (110), forwarding component 42 may determine that learn index 104, which has a value of "00" does not match learn index 105, which has a value of "10" and invalidate flow cache entry 102 (120).

However, in some instances, after completing the flow action learn cycle and before a subsequent flow action learn cycle, forwarding subsystem 37 may further reallocate the memory address referenced by action 106. For example, forwarding subsystem 37 may reallocate the memory address referenced by action 106 and increment learn index 105 to "11" (136) and reallocate the memory address referenced by action 106 and increment learn index 105 to "00" (138). However, in order to prevent an invalid (e.g., stale) memory address to be indicated by the learn index as valid, forwarding component 42 may be configured with a user configurable delayed free time as described below.

Specifically, forwarding subsystem 37 may initiate a timer in response to reallocating the memory address referenced by action 106. In this example, forwarding subsystem 37 may refrain from initiating a subsequent reallocation of the memory address referenced by action 106 until the timer exceeds a delay threshold. The delay threshold may be user configurable as discussed below. Moreover, learn index 104 and learn index 105 may have a configurable number of bits to ensure to prevent an invalid (e.g., stale) memory address to be indicated by the learn index as valid.

The user configurable safe interval may be determined as follows.

For 'n' bits:

A number of combinations before rollover is equal to $2^n$.

A number of allocations before rollover is equal to $(2^n-1)$.

TABLE 1

| | | EXAMPLE USER CONFIGURABLE SAFE INTERVALS | | | | |
|---|---|---|---|---|---|---|
| n | #allocations | Safe interval (Delayed Free = 100 ms) | Safe interval (Delayed Free = 500 ms) | Safe interval (Delayed Free = 750 ms) | Safe interval (Delayed Free = 1 s) | Safe interval (Delayed Free = 2 s) |
| 2 | 3 | 0.3 s | 1.5 s | 2.25 s | 3 s | 6 s |
| 3 | 7 | 0.7 s | 3.5 s | 5.25 s | 7 s | 14 s |
| 4 | 15 | 1.5 s | 7.5 s | 11.25 s | 15 s | 30 s |
| 8 | 255 | 25.5 s | 127.5 s | 191.25 s | 255 s | 510 s |

In the example of Table 1, a user (e.g., admin 66) may select the number of bits (e.g., 'n') and a delay threshold (e.g., "Delayed Free") to achieve a desired safe interval. The delay threshold may refer to an amount of time network device 20 delays reallocating an address after an initial allocation or a reallocation of the address. A safe interval may refer to a maximum amount of time to complete a flow action learn cycle. As shown, network device 20 may ensure that a rollover does not occur for a flow action learn cycle of less than 0.3 seconds when using a learn index having two bits and a delay threshold of 100 milliseconds. To permit a longer flow action learn cycle, for instance of at least 25 seconds, admin 66 may configure a learn index having four bits and a delay threshold of 2 seconds to achieve a 30 second safe interval or may configure a learn index having eight bits and a delay threshold of 0.1 seconds to achieve a 25.5 second safe interval. In this way, admin 66 may select the number of bits of the learn index and the delay threshold to effectively accommodate different applications. For example, admin 66 may select a small number of bits (e.g., 2) for the learn indexes and a low delay threshold (e.g., 100 ms) for systems with a small number of flows. In this example, as a number of flows increases, admin 66 may increase the number of bits for the learn indexes and/or increase the low delay threshold to accommodate the increase in number of flows.

Figure 5:
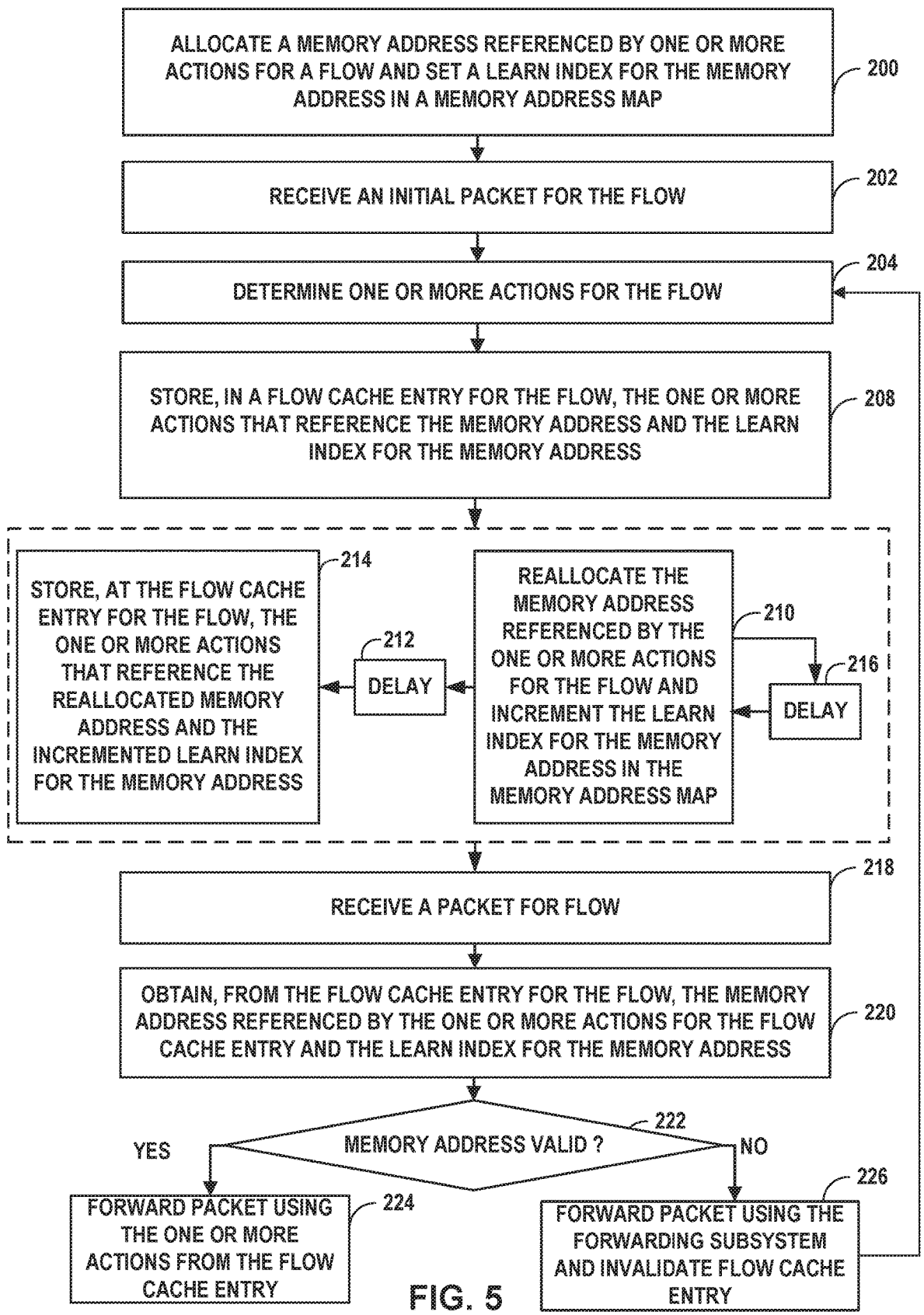
FIG. 5 is a flowchart illustrating an example method for packet forwarding using a learn index in accordance with one or more techniques of this disclosure.

FIG. 5 is a flowchart illustrating an example method for packet forwarding using a learn index in accordance with one or more techniques of this disclosure.

Forwarding subsystem 37 allocates a memory address referenced by the one or more actions for the flow and sets a learn index for the memory address in a memory address map (200). Forwarding component 42 receives an initial packet for a flow (202). Forwarding subsystem 37 determines one or more actions for the flow (204). Forwarding subsystem 37 stores, in a flow cache entry for the flow, the one or more actions that reference the memory address and the learn index for the memory address (208). The forwarding subsystem 37 and forwarding component 42 operate concurrently, such that forwarding subsystem 37 may free or re-allocate memory referenced by actions in the flow cache entry, and forwarding component 42 may process a packet using the actions in the flow cache entry before forwarding subsystem 37 updates the flow cache entry with the new actions referencing different memory as part of a learn cycle.

Forwarding subsystem 37 reallocates the memory address referenced by the one or more actions for the flow and increments the learn index for the memory address in the memory address map (210). After a delay 212 for a flow action learn cycle, forwarding subsystem 37 stores, at the flow cache entry for the flow, the one or more actions that reference the reallocated memory address and the incremented learn index for the memory address (214). After a delay threshold is satisfied (216), the process may include further reallocations (e.g., 210 repeats).

In the example of FIG. 5, forwarding component 42 may receive a packet for a flow (218). As shown in FIG. 5, forwarding component 42 may receive the packet after completing 214, which would result in a valid cache flow cache entry or may receive the packet before completing 214 and after completing 210, which would result in an invalid cache flow cache entry. In any case forwarding component 42 obtains, from the flow cache entry for the flow, the memory address referenced by the one or more actions for the flow cache entry and the learn index for the memory address (220).

Forwarding component 42 determines whether the memory address is valid (222). For example, forwarding component 42 determines the memory address is valid when the learn index from the flow cache matches a learn index stored at the memory address map. In this example, forwarding component 42 determines the memory address is not valid (e.g., invalid) when the learn index from the flow cache does not match a learn index stored at the memory address map.

In response to determining the memory address is valid ("YES" of 222), forwarding component 42 forwards the packet using the one or more actions from the flow cache entry (224). In response, however, to determining the memory address is not valid ("NO" of 222), forwarding component 42 forwards the packet using forwarding subsystem 37 and invalidates the flow cache entry (226).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, (e.g., non-transitory media) and not signals, carrier waves, or other transient media.

What is claimed is:

1. A method comprising:
   receiving, by a network device, a packet for a flow;
   obtaining, by the network device from a flow cache entry for the flow, a memory address referenced by one or more actions of the flow cache entry and a first learn index for the memory address, the first learn index indicating a first allocation of the memory address;
   determining, by the network device, the first learn index matches a second learn index stored to a memory address map entry for the memory address in a memory address map, the second learn index indicating a second allocation of the memory address;
   forwarding, by the network device, in response to the determining, the packet using the one or more actions of the flow cache entry;
   incrementing, by the network device in response to reallocating the memory address referenced by the one or more actions, the second learn index;
   initiating, by the network device, a timer in response to the reallocating;
   refraining from initiating a subsequent reallocation of the memory address referenced by the one or more actions until the timer exceeds a delay threshold; and
   initiating the subsequent reallocation of the memory address referenced by the one or more actions after the timer exceeds the delay threshold.

2. The method of claim 1, further comprising:
   allocating, by the network device, the memory address for the one or more actions;
   setting, by the network device, the second learn index in response to the allocating;
   storing, by the network device, at the flow cache entry, the memory address referenced by the one or more actions; and
   setting, by the network device, the first learn index to match the second learn index.

3. The method of claim 1, further comprising:
   setting, by the network device at a flow action learn cycle, the first learn index to the second learn index.

4. The method of claim 1, wherein the reallocating comprises reallocating, by the network device, the memory address referenced by the one or more actions in response to a configuration change or a state change.

5. The method of claim 1, further comprising:
receiving, by the network device via a management interface, configuration information defining the delay threshold.

6. The method of claim 1, further comprising:
receiving, by the network device, an initial packet for the flow; and
determining, by the network device, the one or more actions for the flow in response to the receiving.

7. The method of claim 1, further comprising:
receiving, by the network device via a management interface, configuration information defining a number of bits for the first learn index and the second learn index.

8. The method of claim 1, wherein the packet comprises a first packet, the method further comprising:
receiving, by the network device, a second packet for the flow;
determining, by the network device, the first learn index does not match the second learn index; and
forwarding, by the network device in response determining the first learn index does not match the second learn index, the second packet using a forwarding subsystem of the network device.

9. The method of claim 8, further comprising:
invalidating, by the network device in response determining the first learn index does not match the second learn index, the flow cache entry.

10. The method of claim 1, wherein the one or more actions of the flow cache entry comprise one or more of a policer action, a counter action, or a Media Access Control (MAC) address update action.

11. A network device comprising:
a flow cache configured to store a flow cache entry for a flow, the flow cache entry indicating a memory address referenced by one or more actions of the flow cache entry and a first learn index for the memory address, the first learn index indicating a first allocation of the memory address;
a memory address map configured to store a second learn index for the memory address, the second learn index indicating a second allocation of the memory address; and
one or more processors implemented in circuitry, the one or more processors being configured to:
receive a packet for the flow;
obtain, from the flow cache entry for the flow, the memory address referenced by the one or more actions of the flow cache entry and the first learn index for the memory address;
determine the first learn index matches the second learn index;
forward, in response to the determining, the packet using the one or more actions of the flow cache entry;
increment, in response to reallocating the memory address referenced by the one or more actions, the second learn index;
initiate a timer in response to the reallocating;
refrain from initiating a subsequent reallocation of the memory address referenced by the one or more actions until the timer exceeds a delay threshold; and
initiate the subsequent reallocation of the memory address referenced by the one or more actions after the timer exceeds the delay threshold.

12. The network device of claim 11, wherein the one or more processors are further configured to:
allocate the memory address for the one or more actions;
set the second learn index in response to the allocating;
store, at the flow cache entry, the memory address referenced by the one or more actions; and
set the first learn index to match the second learn index.

13. The network device of claim 11, wherein the one or more processors are further configured to:
set, at a flow action learn cycle, the first learn index to the second learn index.

14. The network device of claim 11, wherein to reallocate the memory address the one or more processors are further configured to:
reallocate the memory address referenced by the one or more actions in response to a configuration change or a state change.

15. The network device of claim 11, wherein the one or more processors are further configured to:
receive, via a management interface, configuration information defining the delay threshold.

16. A non-transitory computer-readable storage medium comprises instructions for causing a programmable processor to:
receive a packet for a flow;
obtain, from a flow cache entry for the flow, a memory address referenced by one or more actions of the flow cache entry and a first learn index for the memory address, the first learn index indicating a first allocation of the memory address;
determine, the first learn index matches a second learn index stored to a memory address map entry for the memory address in a memory address map, the second learn index indicating a second allocation of the memory address;
forward, in response to the determining, the packet using the one or more actions of the flow cache entry;
increment, in response to reallocating the memory address referenced by the one or more actions, the second learn index;
initiate a timer in response to the reallocating;
refrain from initiating a subsequent reallocation of the memory address referenced by the one or more actions until the timer exceeds a delay threshold; and
initiate the subsequent reallocation of the memory address referenced by the one or more actions after the timer exceeds the delay threshold.

* * * * *